United States Patent [19]
Snead

[11] Patent Number: 4,800,972
[45] Date of Patent: Jan. 31, 1989

[54] APPARATUS FOR WEIGHING ROLLING RAILCARS

[75] Inventor: Edwin D. Snead, Georgetown, Tex.

[73] Assignee: Kilo-Wate, Inc., Georgetown, Tex.

[21] Appl. No.: 119,038

[22] Filed: Nov. 16, 1987

[51] Int. Cl.⁴ .................................................. G01G 19/04
[52] U.S. Cl. ......................................................... 177/163
[58] Field of Search ............................................. 177/163

[56] References Cited

U.S. PATENT DOCUMENTS

| 3,085,642 | 4/1963 | Raskin | 177/163 |
|---|---|---|---|
| 3,155,184 | 11/1964 | Raskin | 177/163 |
| 3,159,227 | 12/1964 | Raskin et al. | 177/163 |
| 3,276,525 | 10/1966 | Cass | 177/1 |
| 3,356,170 | 12/1967 | Cory et al. | 177/163 |
| 3,374,844 | 3/1968 | Rogers | 177/134 |
| 3,446,298 | 5/1969 | Cory et al. | 177/7 |
| 3,446,299 | 5/1969 | Leonowicz | 177/25 |
| 3,448,424 | 6/1969 | Laimins | 338/5 |
| 3,646,327 | 2/1972 | Tonies et al. | 235/92 |
| 3,734,216 | 5/1973 | Nordstrom et al. | 177/136 |
| 3,741,327 | 6/1973 | Nordstrom et al. | 177/163 |
| 4,416,342 | 11/1983 | Snead | 177/163 |

FOREIGN PATENT DOCUMENTS 1283046  1/1962  France .
 859630  4/1961  United Kingdom .
1290342  6/1972  United Kingdom .

Primary Examiner—George H. Miller, Jr.
Attorney, Agent, or Firm—Daniel Rubin

[57] ABSTRACT

Various improvements are disclosed for enhancing accuracy in a system for weighing rolling railcars in order to remedy previous factors contributing to weighing inaccuracies. In a system operative by means of a plurality of longitudinally spaced sensors secured to a predetermined length of relatively unsupported track for measuring track stresses imposed by a passing railcar, accuracy of the weighing result is enhanced by several structural improvements. Included among the improvements is a substructure underlying the live rail that eliminates yield at the fulcrum location from the supported to the unsupported rail. Also included are tandem scales operative sequentially in the path of motion for obtaining readings at selectedly different locations about the circumference of the wheel and from which an averaged signal is obtained for determination of car weight. Signal compensation is also provided for both changes in track temperature and drift in instrument calibration.

14 Claims, 4 Drawing Sheets

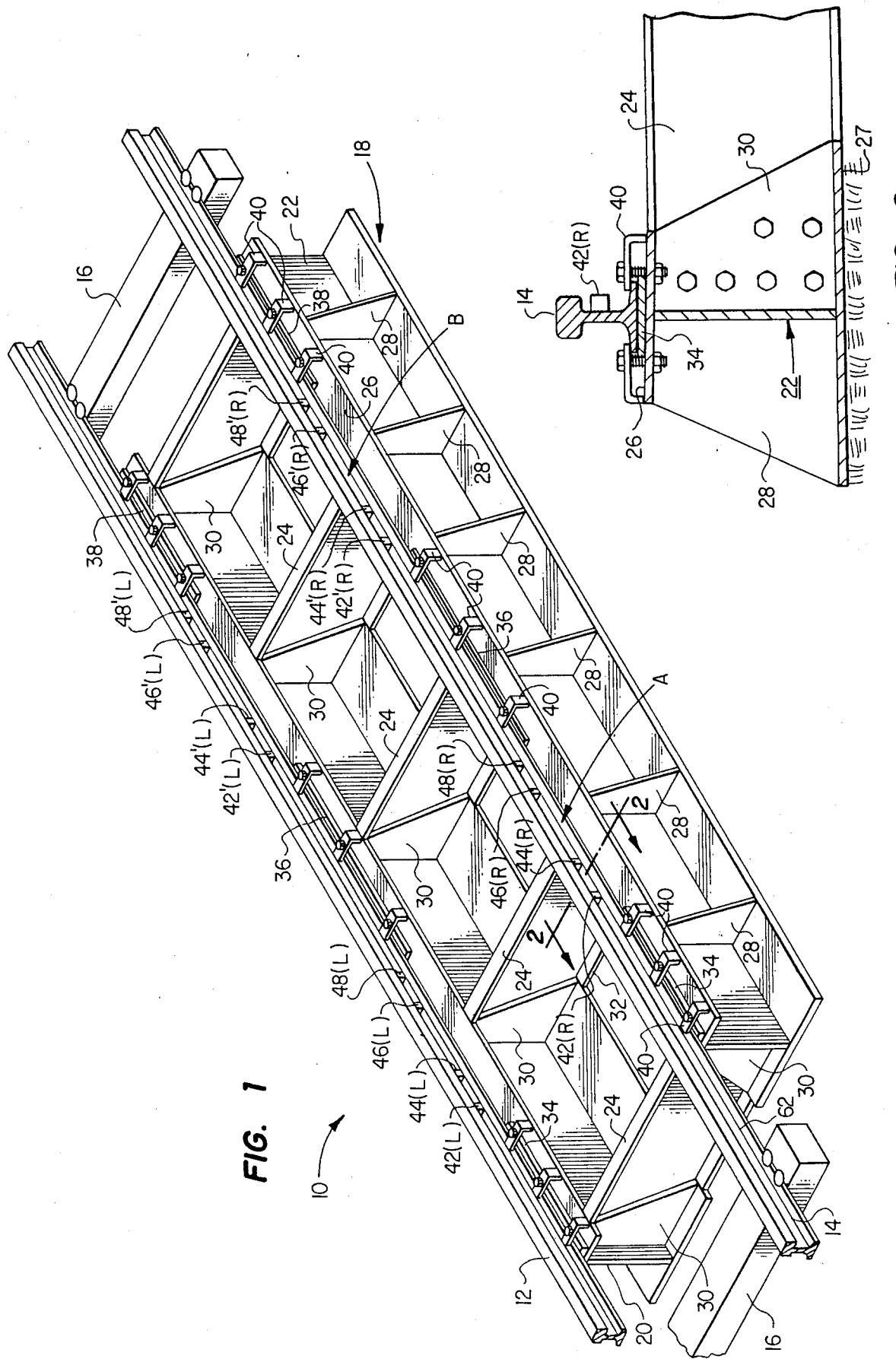

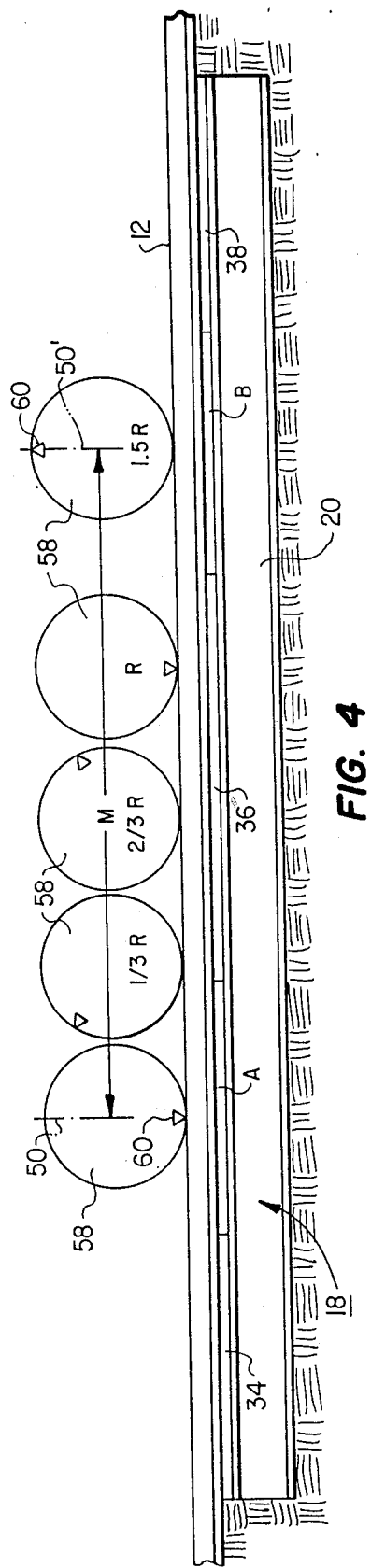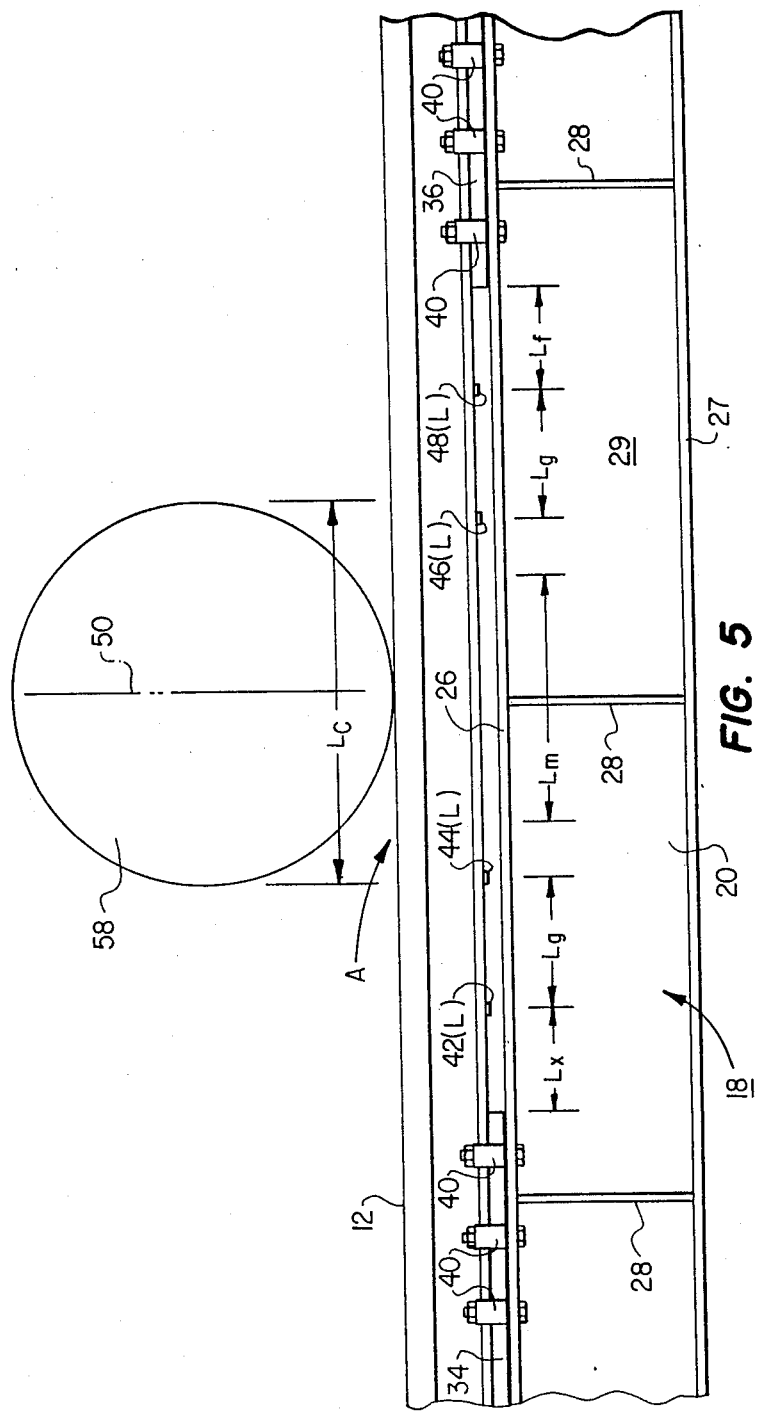
FIG. 4
FIG. 5

APPARATUS FOR WEIGHING ROLLING RAILCARS

TECHNICAL FIELD

The field of art to which the invention pertains comprises the art of measuring and testing as applied to the weighing of rolling railroad stock.

BACKGROUND OF THE INVENTION

The need and capability of weighing railcars in motion has been well established as disclosed for example in prior U.S. Pat. Nos. 3,155,184; 3,734,216; and 4,416,342 incorporated herein by reference. Disclosed in my prior U.S. patent is a method and apparatus to effect such weighing by obtaining strain gauge inflection measurements along a controlled length of unsupported track. Operation of the system thereof is dependent on discreet electrical signals being generated by individual inflections for each axle of the passing railroad car. The signals combine to yield a constant sum of the bending moments which when summed for all four axles can be converted, from a bridged output signal, to the actual weight of the railcar.

The foregoing system disclosed in my '342 patent has performed well and met with commercial success in providing substantial accuracy of result within about one-half of 1 percent compared to individual cars weighed uncoupled at rest on a platform scale. This inaccuracy however marginal, is generally attributed to various factors operable in combination and previously unrecognized. One factor believed to be contributing is the unpredictable compression of the wood fibers contained in the wood crossties of the track forming the fulcrum nearest the lead and trailing ends of the unsupported track section. That is, the prior system utilized otherwise standard railroad beds for the approaches including the wood crossties. Those crossties disposed at the transition immediately before and after the adjacent unsupported section of track tend to carry a disproportionate larger load than do the upstream and downstream crossties having helper ties on both sides by which the received load can be distributed. It is believed that the weight of the passing train wheels cause the wood fibers of the adjacent ties to temporarily yield during the time period in which inflection measurements are being taken thereby distorting their measurement accuracy. Another equally significant factor is wheel eccentricity resulting from either manufacturing tolerance and/or in-service wear. The eccentricity can typically vary from 0.005 inches to 0.031 inches, and in the course of motion can generate an additional weighing force of approximately 1/10 of 1 percent of the actual weight of the wheel being weighed. With eight wheels on a typical ordinary freight car, the error produced by such eccentricities can in effect compound the inaccuracy to on the order of about 1/10 of 1 percent greater or lesser than the actual weight of the car.

Yet further factors contributing to the aforementioned inaccuracies are believed to result from previously unrecognized effects of temperature on the rail modulus of elasticity as well as calibration drift in the instrumentation utilized for receiving the bridged output signal from the strain gauges.

SUMMARY OF THE INVENTION

The invention relates to improvements in apparatus of my aforementioned '342 patent for weighing of rolling railroad cars. More specifically, the invention relates to improvements in such apparatus each separately contributing to more enhanced accuracy than heretofore in the determined weight of each individual railroad car as compared to a static weight determination thereof.

The foregoing is achieved in accordance with the invention by structural variations from that previously utilized for remedying or substantial remedying weighing inaccuracy factors previously associated with my prior system mentioned supra. Unlike the wooden crossties subject to compression in the manner of the prior system, the invention hereof utilizes a steel framed structure running longitudinally beneath the rail for a substantial distance on either side of the live rail. The structure is provided with a very wide bearing flange on the bottom so as to distribute train weight over a large area of soil. A very deep section on the order of about 15 inch contributes towards stability from a very high moment of inertia and section modulus. The components of the framework are selected to ensure that no part of the structure is stressed to any substantial fraction of the yield point so that following deflection, if any, the support structure is always restored to its original configuration.

For overcoming the adverse effects of wheel eccentricity, each wheel in accordance with the invention is weighed more than once at angularly separated locations about the circumference of the wheel. For this purpose, two or more separate scales, as appropriate, are tandem arranged each with their associated electronics supplying a bridge signal to a common computer. The respective scales are utilized to produce separate weighings which are compared and/or averaged by the computer to insure a correct result.

To offset the adverse effects of rail temperature a temperature sensor in the area of the scale is utilized to provide continuous temperature compensation to the instrumentation to effect calibration thereof as a function of temperature. In this manner, the effect of temperature change and consequent change in modulus of elasticity is compensated for before each train is weighed.

To eliminate the noted adverse effects of scale drift, an automatic zero offset is provided that is operative after measurements are taken during an absence of cars or while the middle of a car is passing over the unloaded scale.

The above noted features and advantages of the invention as well as other superior aspects thereof will be further appreciated by those skilled in the art upon reading the detailed description which follows in conjunction with the drawings.

BRIEF DESCRIPTION OF THE DRAWINGS

FIG. 1 is an isometric view of a section of railroad track embodying the invention;

FIG. 2 is a sectional elevation of a typical transverse section through the support structure of FIG. 1;

FIG. 4 is fragmentary longitudinal elevation of a car wheel to rail relation of FIG. 1;

FIG. 5 is an enlarged view similar to FIG. 4 for locating the instrumentation;

DESCRIPTION OF THE PREFERRED EMBODIMENT

Figure 3:
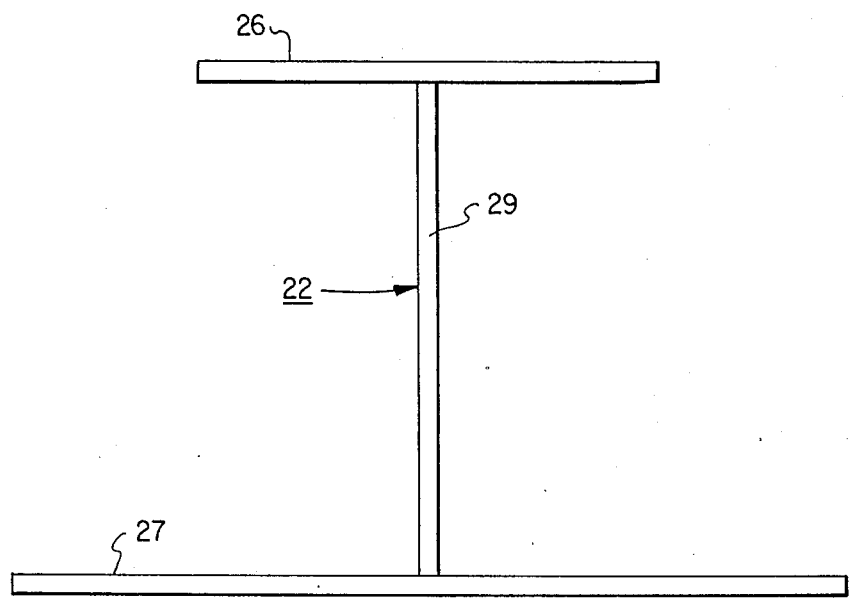
FIG. 3 is an enlarged view of the support beam of FIG. 2.

In the description which follows, like parts are marked throughout the specification and drawings with the same reference numerals respectively. The drawing figures are not necessarily to scale and in certain views, parts may be drawn rotated into the plane of the drawing for purposes of clarity.

Referring now to the drawings, there is illustrated in FIG. 1 a conventional railroad track 10 comprised of parallel spaced apart rails 12 and 14 normally supported on wooden crossties 16. In accordance with the invention hereof the crossties in a predetermined length of track 10 have been removed and replaced by a firmly rigid substructure hereof designated 18. Substructure 18, as will be understood, is embedded in the local soil thereat to an elevation as will maintain substantial elevation continuity of the rails 12 and 14 for a train passing thereover. The function of substructure 18 is to provide a rigid unyielding support for two tandem scales A and B, as will be described, located at select intermediate areas along the surface 26 thereof. To fulfill that purpose, substructure 18 is characterized by a framework arrangement of components designed to avoid being stressed to any substantial fraction of the yield point. While some deflection from load may be incurred as a result of poor soil conditions, etc. it is intended that the substructure 18 will always return to its original configuration.

Comprising substructure 18 are two parallel and spaced apart wide flange I-beams 20 and 22 joined together by a plurality of longitudinally spaced transverse I-beams 24. The upper flange 26 of the I-beams 20 and 22 is longitudinally reinforced by a plurality of spaced apart vertical ribs 28 while the interior thereof includes a plurality of spaced apart gusset plates 30 securing beams 24 to both beams 20 and 22. Beam 24 includes a wide bottom flange 32 cut to dimensionally interfit between the bottom flanges of beams 20 and 22. Along the longitudinal surface 26 at controlled locations of each of the beams 20 and 22 there is provided a predetermined length of spaced apart bearing plates 34, 36 and 38 on which the rails are directly supported and secured by a plurality of side clamps 40. Between the bearing plates are located the weigh scale sections A and B hereof over which the rails are relatively unsupported for deflection measurement as will be described. It will be appreciated that substructure 18 as described contemplates providing extensive surface area along the underside in order to distribute the weight of a train over a large area of soil. Specifically included in the construction thereof is a deep section on the order of about 15 inches in order to develop a very high moment of inertia and section modulus. Assuming for example beam 22 as shown in FIG. 3 is of ½ inch steel plate having a top flange 26 of 12 inch width and a bottom flange 27 of 24 inch width separated by a web 29 of 14 inch height, there results a moment of inertia of approximately 1060 inches$^4$. This value corresponds to approximately sixteen times the moment of inertia of rail 14 supported thereon.

In accordance with the invention hereof, each substructure 18 will support at least two tandem arranged scale sections designated A and B although additional tandem sections may be utilized as will be explained. Each section is operable similarly in the manner generally described in my prior patent mentioned supra. Briefly, deflection measurements of the live rails for each scale section are obtained by use of four selectively spaced strain gauges 42, 44, 46 and 48 designated "(L)" for track 12 and ("R") for track 14. Corresponding strain gauges in scale B are further designated with the prime symbol. The strain gauges are positioned on each of rails 12 and 14 symmetrically about a centerline 50. As shown in FIG. 5, the spacing for each scale from the end of bearing plates 34 and 36 representing the fulcrum or transition point between supported track and unsupported track to the strain gauges at 42 and 48 are designated $L_f$ while the spacing between the first and last pair of gauges outboard to inboard is designated $L_g$. The intermediate spacing between the inboard gauges is designated $L_c$ and the measurement span through which the constant value of the sum of moments occur is designated $L_m$.

The signals emitted by the individual strain gauges are transmitted in a bridge circuit (FIG. 6) from each of scales A and B to a common computer 52 with the majority of signal being determined by the spacing between the inboard and outboard gauges. It is ordinarily preferred that $L_g$ not be less than about 8 inches although lesser spacing to 5 inches can be utilized where adequate amplification is available. The computer receives an output signal from each of the respective bridges at such time as wheel 58 is traversing the scales.

Figure 8:
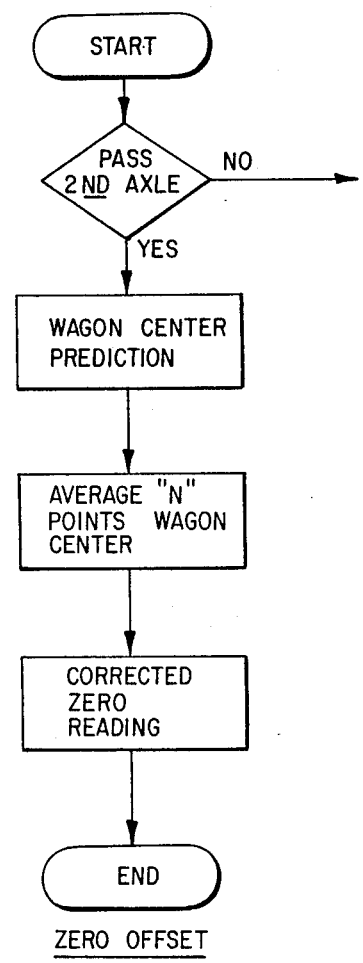

Automatic zero adjustment of computer 52 is effected by computer software (FIG. 8) at such time as the scales A and B are unloaded as occurs between the passing axles. The unloaded condition can be determined by the unloaded signal levels being received via the bridge circuits. Adjustment is effected via a subprogram in the computer that at nonload corrects the zero-load offset number which is subtracted from each wheel to yield the net load thereof. As illustrated in the flowchart of FIG. 8 center location of a passing car is predicted on the basis of car speed on the passing of the second axle. A number of center location of points "N", usually about twenty are averaged to establish a new zero reading for the respective car.

Figure 7:
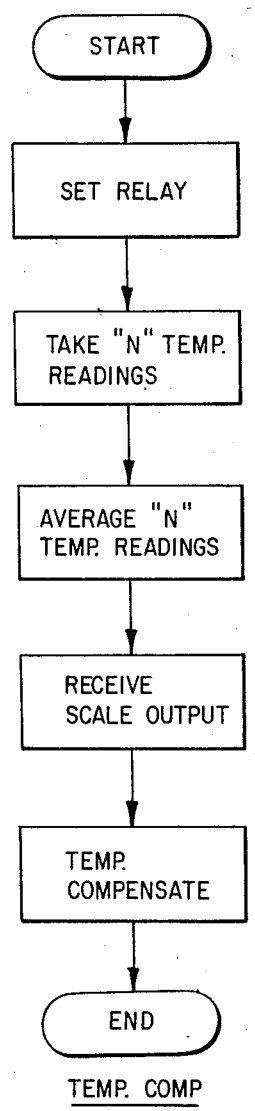
FIGS. 7 and 8 are software flowcharts for effecting temperature compensation adjustment and zero offset adjustment respectively.

Also associated with computer 52 is a temperature sensor 62 mounted on rail 14. Sensor 62 likewise is connected to computer 52 via a subprogram (FIG. 7) to provide a temperature compensation to the output from the individual bridge circuits as a function of temperature induced change in the modulus of elasticity of the steel rails. As illustrated in the flowchart of FIG. 7, a number of temperature readings "N", usually about ten, is obtained from the sensor 62 from which an average temperature is determined in degrees "F". The yielded average is introduced to the scale output in which the temperature compensated scale calibration GAIN=-GAIN*(1−$K_t$*DEGF)) where $K_t$ is a temperature constant.

As previously described, wheels 58 are seldom if ever perfectly concentric. This is attributed to problems both associated with original manufacturing as well as the continuous in-service wear which the wheels incur. As a consequence, it is common to periodically restore wheel concentricity to within controlled dimensions by turning them on a lathe. Because of the eccentricity, however, rolling movement of the wheel and supporting axle on a level track causes the bearing and supported load to incur slight oscillating up and down displacement. The path followed by the center of the bearing describes a cycloid while the vertical motion with reference to the angular displacement describes a cosine wave. Upward and downward velocity of such a system may be described by the first derivative of the cosine wave which is a sine wave or a cosine displaced by 90°. The effect thereof is to produce a minor degree of acceleration which in turn generates additional force on the order of approximately 1/10 of 1% of the actual weight of the wheel being weighed. With eight wheels on an ordinary freight car it is distinctly possible that at least one or more of the wheels have relatively large eccentric errors. As a result, an indicated weight of the freight car could be as much as 1/10 of 1 percent greater or lesser than the actual weight statically determined.

For overcoming or remedying the yielded measurement inaccuracies resulting from wheel eccentricity, the invention hereof contemplates procuring the corresponding strain gauge measurements at different predetermined locations about the circumference of the wheel. By obtaining a plurality of readings about a common wheel an average force can more closely if not accurately establish the actual weight being supported by a particular axle. To achieve the multiple measurement, the weigh system hereof utilizes the tandem scales A and B (FIGS. 1 and 4) at presettable distances whereby measurements can, for example, be obtained at one-half, three-halves or five-halves of the circumference of the wheel 58. Additional scales of three or more in tandem could likewise be utilized where it is desired to obtain measurements at a corresponding number of additional points. Three tandem scales would for example enable measurements to be taken also at two-thirds and four-thirds revolutions at 240° intervals.

Assuming therefore that wheel 58 is of a conventional 36 inch diameter, it would have a circumference of approximately 113 inches. To therefore achieve one-half revolution measurement, the longitudinal dimension M between the corresponding centerlines 50 of scales A and B calculates to 56½ inches. It is preferred in accordance herewith that the most favorable location for the second weighing rail be spaced at a dimension M (FIG. 4) which is substantially 1.5 revolutions of a reference location 60 on wheel 58 for a total spacing M of 170 inches. For that spacing, it may be preferred to utilize two longitudinally spaced apart substructures 18 instead of the integral tandem structure shown in FIG. 1.

Figure 6:
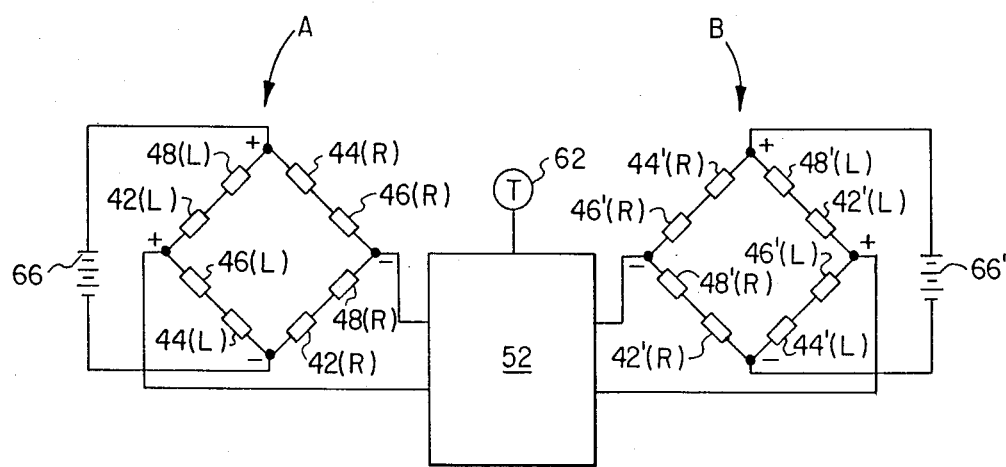
FIG. 6 is a schematic circuit diagram of the instrumentation portion of the weighing system hereof.

In operation and assuming the bridge circuits of FIG. 6 are continuously actuated or are timely rendered actuated, detection of the bridge output and converting that output to the weight of a complete railcar would be controlled by the computer responding to input signals from the respective bridge circuits. The functions of the computer may include first at scale A and then at scale B the following:

1. The computer counts the input cycles for each of four axles
2. When the first input cycle is initiated the computer takes and accumulates N(128 for example) successive intermittent readings of the bridge output during a period of approximately 0.26 seconds while the axle traverses the measurement span $L_m$.
3. The accumulated N readings are divided by N to determine an average load value.
4. Store the axle load value.
5. Count the second input cyle initiated by a wheel of the second axle.
6. Repeat steps 2, 3 and 4.
7. Count the third input cycle initiated by a wheel of the third axle.
8. Repeat steps 2, 3, and 4.
9. Count the fourth input cycle initiated by a wheel of the fourth axle.
10. Repeat steps 2, 3 and 4.
11. Sum the stored load values for the four axles at scale B and subtract four times the no load value.
12. Repeat steps 1–11 for scale B.
13. Average the stored sum values of step 11 for scales A and B.
14. Multiply the average of step 13 by a calibration factor and a temperature correction factor to convert it to the total weight of the railcar.

During a period of inactivation between wheels, as when the middle of the car passes over the respective scales, the scales are unloaded and the zero offset is corrected if necessary by the computer software (FIG. 8). Temperature compensation during that time period is continuously being provided by temperature sensors 62 and likewise corrected, if necessary, by the computer software (FIG. 7). Each scale has its own amplifier and associated electronics and the two scales feed into a single computer source. Readings from one scale go to one location in memory and the readings from the other scale go into another. The computer program then has the burden of keeping track of which direction the train is moving, matching the readings on the two separate scale sections and calculating the average reading between them. Both the zero adjustment and the temperature compensation are achieved by software programming within the computer.

By the above description there is disclosed novel improvement apparatus for enhancing the weighing accuracy of scale systems utilized for the weighing of rolling railroad cars. By virtue of having identified specific causes of the previous inaccuracies the invention hereof enables various features to be altered for remedying the features of such previous constructions that contributed to the inaccuracies. Yielded accuracy is of course always a virtue and indeed is frequently a governmental requirement for matters such as commodity weights being shipped to consumers. While the advantages of weighing a rolling car had previously been recognized, the ability to do so with a high degree of accuracy is extremely advantageous to achieve acceptability and thereby enable enjoyment of the economic savings which such a system affords.

While many changes could be made in the above construction and many apparently widely different embodiments of this invention could be made without departing from the scope thereof, it is intended that all matter contained in the drawings and specification shall be interpreted as illustrative and not in a limiting sense.

What is claimed is:

1. In a system for weighing railcars in motion including a weigh scale comprising a plurality of longitudinally spaced sensors secured to a predetermined length of relatively unsupported rail track for measuring rail track stresses imposed by a railcar passing thereon, the improvement comprising a plurality of said weigh scales arranged in tandem on said rail track for enabling stress measurements to be obtained from a plurality of different select locations about the circumference of a common wheel.

2. In a system in accordance with claim 1 including a substructure underlying said rail track to provide a fulcrum support relation for the unsupported rail track comprising said plurality of scales and said substructure is characterized by physical properties able to withstand car loading moving past said scale without being stressed to a value approaching the yield points of its components.

3. In a system in accordance with claim 2 in which said substructure is characterized by a section moment of inertia at least five times greater than the section moment of inertia of the rail track thereon.

4. In a system in accordance with claim 2 in which said substructure extends past a transition location from a rail track approach providing underlying support for the track to said relatively unsupported track overlying said scale and said underlying substructure at said transition location is able to withstand said imposed loading.

5. In a system in accordance with claim 4 in which said substructure integrally extends underlying said plurality of scales.

6. A system in accordance with claims 1 or 5 in which said scales are operative to individually emit discrete electrical output signals correlated to the magnitude of track stresses being sensed, and said improvement includes common means to receive the output signal from each of said plurality of scales and said common means is operative to average the separate signals received from the respective of said scales to yield a signal determination of the weight supported by each wheel of the passing railcar.

7. A system in accordance with claim 6 in which said scales are set apart at a predetermined longitudinal spacing affording select locations about the circumference of a common wheel at which corresponding measurements at each scale are to be taken.

8. A system in accordance with claim 7 in which said predetermined spacing is selected for a first scale to effect a first measurement at a first location on the common wheel and for a second scale to effect a second measurement at a second location on the common wheel corresponding to a distance approximately equal to one and one-half revolutions of the common wheel.

9. A system in accordance with claim 6 in which said common means comprises a computer means and said computer means is precalibrated for operation at a standard condition for yielding an output signal correlated to the derived signal average and there is included temperature sensor means operative to continuously monitor the rail temperature in the vicinity of said scales and provide a compensation signal to said computer means correlated to the temperature deviation from the standard conditions to which said computer means has been precalibrated for said computer means to yield a temperature corrected determination of the yielded weight signal.

10. A system in accordance with claim 9 in which said temperature sensor means is responsive to temperature induced changes in the modulus of elasticity of the track rail thereat.

11. A system in accordance with claim 6 including zero adjustment means operative to effect zero offset of said computer means during unloaded conditions of said scales and control means operable to detect existence of an unloaded condition thereat enabling said zero adjustment means to become operative.

12. A system in accordance with claim 11 in which said control means comprises a non-load signal being received at said computer means.

13. A system in accordance with claim 11 in which said zero adjustment means is operative to derive an offset number to be subtracted from the yielded weight signal of each wheel for effecting a net load signal thereof.

14. In a system for weighing railcars in motion on track supported over wood support ties including a weigh scale comprising a plurality of longitudinally spaced sensors secured to a predetermined continuous uninterrupted length of said track relatively unsupported over a spaced interruption of said ties for measuring track stresses imposed by a railcar passing thereon, the improvement comprising a steel substructure underlying said rail track spanning the spaced interruption of said ties to provide a fulcrum support relation for the unsupported rail track comprising said scale and said substructure is characterized by physical properties able to withstand car loading moving from past said ties to past said scale without being stressed to a value approaching the yield points of its components.

* * * * *